United States Patent Office 3,162,575
Patented Dec. 22, 1964

3,162,575
METHOD OF CONTROLLING FACE FLIES ON LIVESTOCK
Dickson S. Lang, Kansas City North, Mo., assignor to Consumers Cooperative Association, Kansas City, Mo., a corporation of Kansas
No Drawing. Filed Dec. 4, 1961, Ser. No. 156,942
2 Claims. (Cl. 167—53.2)

The present invention relates to a method of controlling face flies on livestock and particularly to a novel process of killing face flies resting on an animal's face by application of an insecticide composition to the animal's face and without the insecticide migrating into the animal's eyes, nose or mouth.

In the past, it has been conventional for livestock producers to place a coating of an insecticide on the faces of animals in order to prevent face flies from accumulating on the animals' faces and particularly around their eyes and nose, but these prior compositions have not been satisfactory for many reasons, including the short life of the insecticide, the tendency of the insecticide materials to spread over the animals' faces and into their eyes, nose and mouth, as well as the inconvenience of applying the insecticide in various forms such as sticky materials which tend to attract the flies but then cause flies killed by the insecticide to be retained on the animals' faces. Not only was the insecticide subject to rapid dissipation, but the material was frequently depleted because of rain washing the material off the animals' faces and thereby normally requiring daily application of the insecticide.

Many of the prior compositions used to control face flies on animals, have been preparations made by the livestock producers themselves, and incorporated some type of insecticide into a sticky substance such as corn syrup or the like. These sticky compositions were then applied to the animals' faces with a brush or the like to prevent face flies from bothering the animals. The compositions were not satisfactory from the standpoint of longevity and frequently caused distress to the animals because of rapid migration of the insecticide into the animals' eyes, nose and mouth shortly after application of the composition. In attempting to relieve the eye and nose discomfort occasioned by the insecticide, the animals frequently rubbed the material either off of their faces, or forced greater quantities of the insecticide into the mucous areas of the eyes and nose and causing even more discomfort.

It is therefore the primary object of the present invention to provide a method of controlling face flies on livestock which permits application of an insecticide composition to the animals' faces between their eyes, and without the side effects of migration of the insecticide into the animals' eyes, nose and mouth, and with the insecticide material being effective for an extended period of time.

Another significant object of the present invention is to provide a process of controlling face flies on animals wherein the residual toxicity of the insecticide is materially increased by incorporating the same into a non-sticky, semi-paste material which is resistant to migration on the animals' faces and thereby precludes movement of the insecticide into the animals' eyes, nose and mouth, even after an extended time following application of the face fly control composition.

It is also an important aim of the present invention to provide a method as described above wherein the insecticide composition, although having a normally relatively short life, is rendered of much longer effective life by virtue of incorporation of the same into the combination of a wax and oil base which precludes rapid deterioration of the insecticide, and which also causes the insecticide to remain on the outer surface of the animal's face so that the same is maintained in disposition to be effective in killing flies which normally are attracted to the animal's face and alight on the area covered by the insecticide. In this respect, it is another very important object of the invention to provide a method as referred to above wherein the face fly control composition contains an attractant for attracting the flies to the area on which the insecticide composition is present so that the flies will be subjected to the insecticide in maximum concentration, thereby producing the most effective kill of flies.

It is also an important aim of the invention to provide a process for controlling face flies on livestock wherein the insecticide composition to be applied to the animal is of characteristics permitting the same to be produced and commercialized in bar or stick form so that the insecticide may be readily applied to the animal's face by the simple expedient of rubbing a portion of the stick across the area of the animal's face between its eyes, and also facilitating ease of packaging of the material and distribution of the same without loss of residual toxicity of the insecticide by virtue of the fact that the entire stick may be enclosed in a suitable air-tight container.

It is a still further object of the invention to provide a method of controlling face flies on livestock wherein the insecticide composition is resistant to dissipation both by way of volatilization of the insecticide and solubilization of the active ingredient in rain water or the like during periods when the livestock are standing out in rain or snow.

Other important objects of the present method will become obvious or be explained in greater detail as the following specification progresses.

Briefly, the present method of controlling face flies on livestock comprises applying a composition to the animals' faces that includes an insecticide effective against face flies and admixed with a carrier material formed of the combination of microcrystalline wax and a medium viscosity oil which cooperate to increase the residual toxicity of the insecticide. The composition is preferably formed into a solid elongated stick which may be placed in a suitable container that includes means therein for shifting the composition toward one end of the container as the material is used up. The insecticide composition in stick form is applied to the animal's face by rubbing one end of the stick across the face of the animal, preferably between its eyes, in order to cause a liberal coating of the material to be retained over the hair of the animal. The insecticide bar contains an attractant in combination with the insecticide to cause flies to be drawn toward the area on the animal's face which is coated with the active ingredient. By virtue of the wax carrier and oily constituent, the material applied to the face of the animal remains in the position where the same is initially placed and does not migrate toward the animal's eyes, nose or mouth.

In producing a face fly stick of preferred constituency, microcrystalline wax is initially melted to form a liquid whereupon a predetermined amount of oil is introduced into the liquid wax along with an insecticide effective against face flies, and in conjunction with a solid attractant. It has been determined that a stick of required characteristics should include, by weight, from ¼% to 1¼% of active ingredient capable of killing face flies, from about 40% to 80% of microcrystalline wax, approximately 10% to 60% of a medium viscosity oil, and from 0% to 50% of an attractant such as powdered sucrose.

A preferred medium viscosity oil may be identified as #80 Mid-Continent crude intermediate stock and has the following characteristics:

| | |
|---|---|
| Gravity | 26.5–28.5. |
| Flash, °F., COC | 510 minimum. |
| Fire, °F., COC | 585 minimum. |
| Vis. @ 100° F., SUS | 850–1150. |
| Vis. @ 210° F., SUS | 78–88. |
| Viscosity index | 80.0 minimum. |
| Color, ASTM | 4.5 maximum. |
| Pour, °F., ASTM | Zero maximum. |
| Con. carbon residue, percent | .20 maximum. |
| Neutralization number | 0.05 maximum. |

By the same token, a preferred, fully refined microcrystalline wax of desired characteristics is as follows:

| | |
|---|---|
| Structure | Plastic-microcrystalline. |
| Melting point, °F. | 155–165. |
| Specific gravity: | |
| @ 60° F. | 0.91–0.94. |
| @ 210° F. | 0.78–0.81. |
| Penetration: | |
| @ 77° F. | 25 maximum. |
| @ 100° F. | 45 maximum. |
| @ 110° F. | 110 maximum. |
| Color | 2 maximum. |
| Oil content, percent | 1.0 maximum. |
| Odor, TAPPI | Nil. |
| Taste | Nil. |
| Viscosity, @ 210° F.: | |
| Centistokes | 11.6–14.2. |
| S.U.S. | 65–75. |

Although a number of different specific insecticides may be employed, the preferred insecticide is dimethyl-dichloro-vinyl-phosphate known by the name "DDVP," and which has been found to be very effective against face flies at a concentration which meets all requirements of governmental authorities and other regulative bodies. A stick of preferred composition comprises by weight, ½% of DDVP, about 60% of the microcrystalline wax, approximately 20% of the intermediate viscosity petroleum oil set forth above, and about 20% of powdered sucrose. In preparing the material, the insecticide, attractant and oil are introduced into the molten wax at a temperature within the range of 150°–160° F., the materials are suitably admixed, and then the material is permitted to solidify, preferably in a mold which is of generally cylindrical configuration. The wax should not be heated above a temperature of about 180° F. in order to prevent caramelizing of the sucrose when the latter is introduced into the liquid wax and which would interfere with the attraction properties of the sugar. It has been found that by providing molds for the insecticide composition which are equivalent to a volume of about 1½ ounces net weight, that a face fly protectant composition may be furnished at an attractive price and which has a relatively long useful life by virtue of the fact that only small quantities of the insecticide composition are placed on the face of the animal at each application. Furthermore, because of the long residual life of the insecticide in the form described above, the composition need not be applied frequently to the animals as has been previously required, but the material may be placed on the animals' faces only at extended intervals. The molten material referred to above may be poured directly into cylindrical containers therefor if desired, and of the specified size, with the wax solidifying to produce a non-sticky, semi-paste which will rub off onto the animal's face when an end of the stick is moved up and down over the area between the animal's eyes and with slight pressure being applied to the stick. It is contemplated that the cylindrical dispenser have means at one end thereof for forcing the stick toward the normally open end of the cylinder so that as the stick is used up during application of the material to the animal's face, the user of the insecticide may force the stick toward the open end. The container normally has a screw top or other suitable closure at the open end thereof so that the container may be closed when not in use and to prevent dissipation of the insecticide so that the same will retain its effectiveness as long as the composition remains in the closed container.

The microcrystalline wax and the oil cooperate to produce a material of viscosity causing the substance to firmly adhere to the animal's face, but without migration of the composition and thereby the insecticide into the animal's eyes, nostrils and mouth. Although DDVP is known to have a very short useful life in the atmosphere, and approaching only two hours, it has been determined that incorporating this insecticide into the carrier specified above, materially increases the residual toxicity of the insecticide and causes the same to remain active for extended periods approaching one month. Thus, it is only necessary that the user of the composition apply the insecticide to the animals' faces at periods of approximately thirty days, although it is to be recognized that during the periods of the year when flies are the most numerous, the insecticide stick can be used at two week intervals or shorter times if felt desirable to more adequately control the face flies.

Having thus described the invention what is claimed as new and desired to be secured by Letters Patent is:

1. A method of controlling face flies on livestock comprising applying a composition to the area of the face of each of the animals adjacent its eyes, nose and mouth, said composition consisting essentially of, by weight, from ¼% to 1½ of dimethyl-dichloro-vinyl-phosphate, from 40% to 80% of microcrystalline wax having a melting point of about 160° F., from 10% to 60% of petroleum oil having a viscosity of approximately 80 SUS at about 210° F., and up to about 50% of particulate sugar.

2. A method of controlling face flies on livestock comprising applying a composition to the area of the face of each of the animals adjacent its eyes, nose and mouth, said composition consisting essentially of, by weight, approximately ½% of dimethyl-dichloro-vinyl-phosphate, about 60% of microcrystalline wax having a melting point of about 160° F., approximately 20% of petroleum oil having a viscosity of approximately 80 SUS at about 210° F., and about 20% of powdered sucrose.

References Cited by the Examiner
UNITED STATES PATENTS

| | | | |
|---|---|---|---|
| 2,819,995 | 1/58 | Wassell | 167—42 |
| 2,929,762 | 3/60 | Wasco | 167—53.2 |

OTHER REFERENCES

Bruce: Journal of Economic Entomology, vol. 53, No. 3, June 1960, pages 450 and 451.

Frear: Chemistry of the Pesticides, Third Edition, 1955, Van Nostrand Co., New York, New York, pages 215–220.

Metcalf: Organic Insecticides, 1955, Interscience Publishers, N.Y., N.Y., page 265.

Gahan: Agricultural and Food Chemistry, vol. 2, No. 8, April 14, 1954, pages 425–428.

LEWIS GOTTS, *Primary Examiner.*

M. O. WOLK, FRANK CACCIAPAGLIA, JR.,
*Examiners.*